United States Patent
Zhang et al.

(10) Patent No.: US 9,709,182 B2
(45) Date of Patent: Jul. 18, 2017

(54) NON CHATTERING PRESSURE RELIEF VALVE

(71) Applicant: Parker-Hannifin Corporation, Cleveland, OH (US)

(72) Inventors: Geoffrey R. Zhang, Northridge, CA (US); Rodney K. Craven, Ojai, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/979,022

(22) Filed: Dec. 22, 2015

(65) Prior Publication Data

US 2016/0153572 A1    Jun. 2, 2016

Related U.S. Application Data

(62) Division of application No. 13/951,536, filed on Jul. 26, 2013, now Pat. No. 9,303,776.

(60) Provisional application No. 61/675,902, filed on Jul. 26, 2012.

(51) Int. Cl.
     *F16K 15/02* (2006.01)

(52) U.S. Cl.
     CPC ............ *F16K 15/021* (2013.01); *F16K 15/02* (2013.01); *Y10T 137/7904* (2015.04)

(58) Field of Classification Search
     CPC ......... Y10T 137/0497; Y10T 137/7925; Y10T 137/7904; F16K 15/066; F16K 15/021
     See application file for complete search history.

(56) References Cited

U.S. PATENT DOCUMENTS

| | | | |
|---|---|---|---|
| 2,916,046 A | 12/1959 | Turansky et al. | |
| 3,036,593 A | 5/1962 | Saville | |
| 3,848,632 A * | 11/1974 | Powell | F16K 17/0433 137/514 |
| 4,757,839 A | 7/1988 | Marchal | |
| 6,073,654 A | 6/2000 | Dettmers et al. | |
| 8,381,764 B2 * | 2/2013 | Matsubara | F16K 15/063 137/220 |
| 9,303,776 B2 * | 4/2016 | Zhang | F16K 15/02 |
| 2009/0250123 A1 | 10/2009 | Matsubara et al. | |

* cited by examiner

*Primary Examiner* — Kevin Lee
*Assistant Examiner* — P. Macade Nichols
(74) *Attorney, Agent, or Firm* — Renner, Otto, Boisselle & Sklar, LLP

(57) ABSTRACT

A pressure relief valve includes a valve body having an inlet and an outlet and defining a first fluid path fluidly connecting the inlet and the outlet of the valve; a valve member axially moveable between a first position and a second position, the valve member configured to close the fluid path in the first position and thereby restrict flow between the inlet and the outlet, the valve member configured to open the fluid path in the second position and thereby allow flow between the inlet and the outlet; a biasing element configured to bias the valve member in the first position; and a friction element resiliently biased laterally against an axially extending surface of the valve member to provide frictional resistance to movement of the valve member and thereby cause hysteresis in axial movement of the valve member between the first position and the second position.

9 Claims, 7 Drawing Sheets

NON CHATTERING PRESSURE RELIEF VALVE

RELATED APPLICATIONS

This application is a continuation of U.S. application Ser. No. 13/951,536 filed Jul. 26, 2013, which claims the benefit of U.S. Provisional Application No. 61/675,902, all of which are hereby incorporated herein by reference.

FIELD OF INVENTION

The present invention relates generally to pressure relief valves, and more particularly to a non chattering relief valve suitable for use in, for example, fuel lines of engine systems.

BACKGROUND

A pressure relief valve (PRV) is a safety device which is designed to divert pressure in the event that a pressurized system of some kind encounters a problem which leads to a dangerous rise in pressure. In the event that pressure in the system becomes too high, instead of blowing out the entire system or damaging system components, the pressurized liquid or gas will vent from the pressure relief valve, bringing the pressure back down and preventing a serious incident. Pressure relief valves can be set to open at a specific pressure.

In one application, relief valves may be incorporated into a PRV assembly to be used on a fuel line of an engine system, to release fluid and maintain pressure in the system based on a preset pressure value.

SUMMARY OF INVENTION

Exemplary valves reduce or eliminate valve chattering. This is a common problem with relief valves operating in or around the pressure range the valve is designed to open at. In systems using conventional valves, oscillation caused harmonics in the system create localized air bubbles that burst along the inner wall of the fuel line tubing downstream from the valve. This bursting of air bubbles in the system can cause localized zones of the fuel line tubing wall to erode. Exemplary valves reduce or eliminate this and other chatter problems.

Therefore, according to one aspect of the invention, a pressure relief valve includes a valve body having an inlet and an outlet and defining a first fluid path fluidly connecting the inlet and the outlet of the valve; a valve member axially moveable between a first position and a second position, the valve member configured to close the fluid path in the first position and thereby restrict flow between the inlet and the outlet, the valve member configured to open the fluid path in the second position and thereby allow flow between the inlet and the outlet; a biasing element configured to bias the valve member in the first position; and a friction element resiliently biased laterally against an axially extending surface of the valve member to provide frictional resistance to movement of the valve member and thereby cause hysteresis in axial movement of the valve member between the first position and the second position.

Optionally, the friction element is a friction ring surrounded by a canted spring.

Optionally, the friction ring is a segmented friction ring.

Optionally, the segmented friction ring includes three segments.

Optionally, the segmented friction ring includes two segments.

Optionally, the friction ring includes a scarf cut.

Optionally, the friction element is an o-ring.

Optionally, the friction element is a flexible spring energized seal.

Optionally, the valve member is a poppet that seals against a valve seat.

Optionally, the pressure relief valve includes an annular spacer in line with the fluid path and configured to remain fixed relative to the body; and includes a poppet chamber in the spacer.

Optionally, a venting hole in the spacer fluidly connects the poppet chamber to the fluid path.

According to another aspect of the invention, a pressure relief valve includes a housing surrounding a first fluid path that fluidly connects an upstream flow passage and a downstream flow passage of the housing, the upstream flow passage being axially aligned with the downstream flow passage; an annular spacer in line with the first fluid path and configured to remain fixed relative to the housing; a poppet chamber in the spacer; a poppet configured to slide axially within the poppet chamber and having a head to seal against a valve seat in the housing, wherein in a first closed position, the poppet prevents fluid flow through the first fluid path, and in a second, open position, the poppet allows fluid flow through the first fluid path; and a biasing element configured to bias the poppet outwardly from the chamber of the spacer into the first closed position, wherein a portion of the first flow path is between the housing and the spacer.

Optionally, a friction element is configured to press laterally against an axially extending surface of the poppet and causes hysteresis in axial movement of the poppet between the first position and the second position.

Optionally, a venting hole in the spacer fluidly connects the poppet chamber to the first flow path.

Optionally, the friction element is a friction ring surrounded by a canted spring Optionally, the friction element is an o-ring.

Optionally, the friction element is a flexible spring energized seal.

The foregoing and other features of the invention are hereinafter described in greater detail with reference to the accompanying drawings.

DETAILED DESCRIPTION

Figure 1:
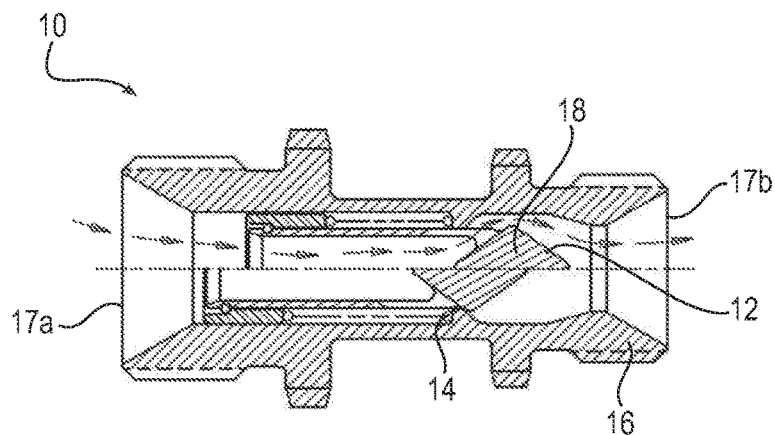
FIG. 1 shows a conventional pressure relief valve with flow from a back end of the poppet through the inner diameter of the poppet to the front of the poppet.
Figure 2:
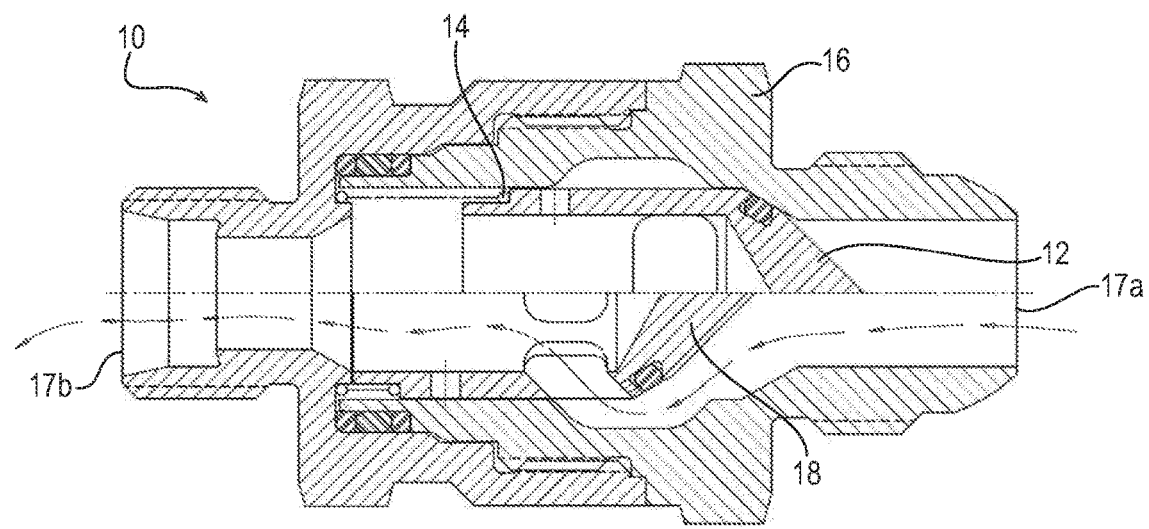
FIG. 2 shows a conventional pressure relief valve with flow from the front of the poppet through the inner diameter of the poppet to the back end of the poppet.

Referring to FIGS. 1 and 2, in conventional pressure relief valves (PRV), the valving mechanism 10 may include a valve member 12 (e.g., a poppet or the like), spring element 14 (e.g., a spring, diaphragm or the like), and a valve body or housing 16. Before the inlet fluid pressure reaches its preset relief pressure, the spring loaded poppet sits on the sealing diametrical area of the housing 16 and seals the fluid from flowing in the inlet 17*a* of the PRV. When the system inlet fluid pressure reaches the preset valve cracking pressure of the PRV, the poppet 12 of the PRV is forced to move from its sealing position on the valve seat to its unseated position by the fluid. That opens the flow passage allowing the fluid to pass through the inlet 17*a* to the outlet 17*b* of the PRV.

It should be noted that for the sake of conciseness, the valve member is sometimes herein referred to as, and is illustrated herein as being, a poppet. However, it should be understood that embodiments may include other types of valve members.

In the conventional PRV, the flow passage is designed to allow the system fluid to flow from the inlet 17*a*, go around the poppet head 18 and through the poppet's flowing windows to poppet's inner diameter and flow out through the outlet 17*b* of PRV (FIG. 2), or inversely, allow the system fluid to flow from the inlet 17*a* through poppet's inner diameter through the poppet's flowing windows and go around the poppet head 18 and flow out to the outlet 17*b* of the PRV (FIG. 1).

In some applications (for example, in engine fuel system applications) the flow rate the PRV is required to work in is too wide of a range (i.e., from very small to very large). Due to the large flow rate requirement, the flow passage of the PRV is designed to have a large flow rate capacity, but at the same time also requires a very low flow to pass through that same passage. At these lower flow rates valve chattering can easily be triggered by a small disrupted flow or mechanically introduced vibration on the system tubing. In summary, the traditional PRV valve chattering is a natural mechanical defect in the design. It can always occur in certain situations.

In the situation of a low flow rate, the fluid in the inlet side of the PRV begins to build in pressure. Once the inlet side pressure exceeds the preset cracking pressure of the PRV, the valve (poppet) is pushed open by the fluid. Once the valve opens, the fluid suddenly escapes from the inlet side of the PRV to the outlet side. At that time, the inlet side of PRV pressure decreases due to the small amount of fluid escaping to the outlet side. In this situation, the poppet (valve) is pushed back to its seated position by the spring and seals the flow on the inlet side of the PRV. Immediately more fluid flows into the inlet side of the PRV and begins building pressure again, repeating the entire process. If the spring loaded poppet opening and closing the inlet of PRV synchronizes with the pulse of the discrete fluid flowing into the PRV and also if this synchronization frequency matches the natural frequency of the poppet spring of the PRV, the spring-poppet system of the PRV will generate chattering or oscillating.

Valve chattering or oscillating is a very serious problem for the PRV, especially in fuel system applications. First it will dramatically reduce the usage life of the PRV. Second, the valve chattering will cause system pressure fluctuation and discrete fluid flow. The pressure fluctuation and discrete fluid flow will generate cavitations and form vortices and air bubbles in the stream of flow. Even worse, if these air bubbles continue to be produced and flow along the system tubing and burst on the wall of the tubing at the same location, the tubing wall will begin to erode. If this point is reached, it will not take long for pin holes to form in the tubing wall. Fuel will begin to leak through these pin holes into the exterior of the system and could cause a catastrophic failure of the engine system. By eliminating the valve chattering in a PRV it can eliminate the vortices and air bubbles in the system, ultimately preventing the engine fuel system from a catastrophic failure.

Exemplary Non Chattering Pressure Relief Valves (NCPRV) basically resolve the valve chattering problem throughout the entire flow rate range. As shown in FIGS. 3-7, the NCPRV 100, 200, 300, 400 may include a valve body 110, 210, 310, 410 a valve member (e.g., a poppet) 120, 220, 320, 420 a biasing element (e.g., a spring) 130, 230, 330, 430 and a friction element 140, 240, 340. Other optional features of the NCPRV include a canted spring 142, 242, 442, spacer 150, 250, 450, O-ring 160, back up ring 165, and lockwire 170, 270, 370, 470.

When the system pressure on the inlet 117*a* is increased to higher than the preset relief pressure, the system fluid pushes the valve member (poppet) 120 to leave its seat 122 and open the flow passage. The system fluid will flow from the inlet side to the outlet side of NCPRV and it relieves the inlet system pressure. On the other hand, when the system pressure in the inlet 117*a* is reduced to below the preset reseat pressure, the valve member (poppet) 120 will be pushed back to its seating position by the spring 130 and close the flow passage. The system fluid flow will be stopped from the inlet 117*a* to outlet 117*b* of the NCPRV 100. That way, the inlet pressure is always maintained in a preset pressure range to satisfy system operating requirements (for example, an engine fuel system's operating requirement).

The valve body 110 defines a first fluid 112 path fluidly connecting an upstream side of the valve (inlet) and a downstream side of the valve (outlet). The valve body 110 may include a valve seat 122 (alternatively, the valve seat may be formed on a separate element) for the valve member (poppet) 120 to seal against.

The valve body 110 may include one or more valve housings, for example, an inner housing 116 and an outer housing 114. In the illustrated example, the valve seat 122 is part of the inner housing 116. The inner housing 116 and outer housing 114 may be coupled together in various manners, but are threaded together in the illustrated example. The threads locking mechanism may be formed by the lockwire 170. The lockwire 170 is connected the inner housing 116 and outer housing 114 through the lockwire holes 171 to prevent the joint threads of the inner housing 116 and outer housing 114 from unscrewing.

The valve member 120 may be axially moveable between a first position and a second position. In the first position, the valve member closes the fluid path to thereby restrict flow between the inlet 117*a* and the outlet 117*b*. In the second position, the valve member opens the fluid path to thereby allow flow between the inlet 117*a* and the outlet 117*b*. The valve member may be a poppet 120 biased by a spring 130.

The biasing element 130 or spring biases the valve member 120 into the first position. In other words, the biasing member 130 biases the valve member closed. The strength of the spring 130 may be preset and selected to set the pressure at which the relief valve operates. Alternatively, the spring force may be adjustable.

When the valving of PRV starts to oscillate at certain low flow rates, there is a damping mechanism, the friction element 140, built into the NCPRV that stops the valve from oscillating. The friction element 140 presses laterally against a side of the valve member and causes hysteresis in axial movement of the valve member 120 between the first position and the second position. In an exemplary valve 100, the friction element includes a friction ring 143 and canted spring 142. The spring loaded friction ring 143 may always be in contact with the poppet 120.

The friction element 140 is not limited to using a friction ring 143 and canted spring 142. An alternative design may use a flexible spring 242 energized seal 243 with a modified female gland (see FIG. 5), a standard (usually stretched) O-ring 340 with a modified female gland (see FIG. 6), or a metal segmented friction ring 443 loaded with a canted spring 442 (see FIG. 7).

Figure 8:
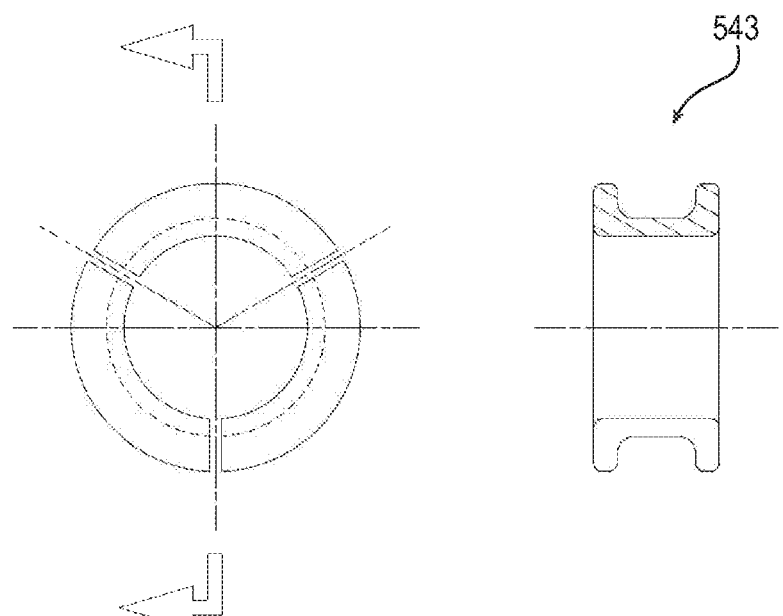
FIG. 8 shows an exemplary metal segmented friction ring in three segments.
Figure 9:
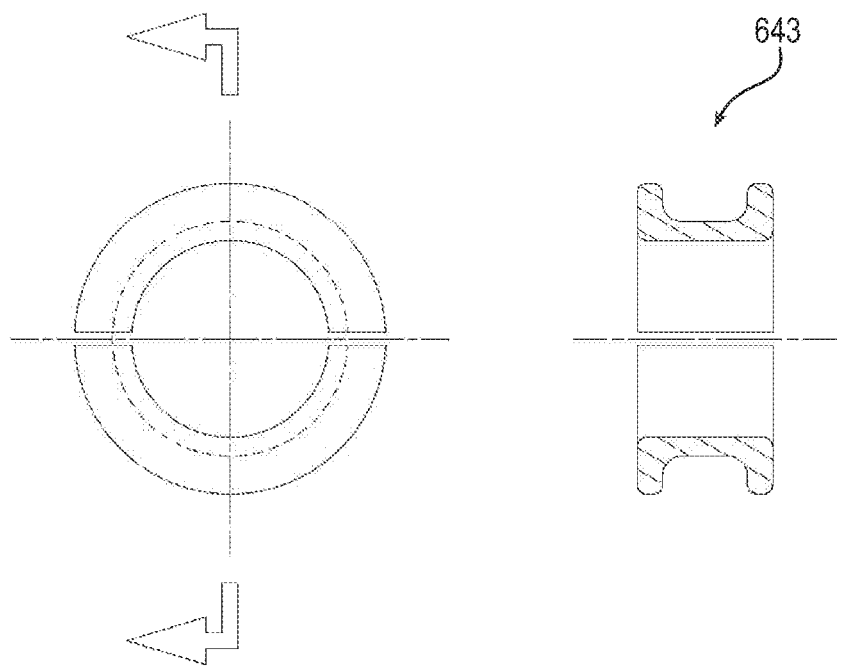
FIG. 9 shows an exemplary metal segmented friction ring in two segments.
Figure 10:
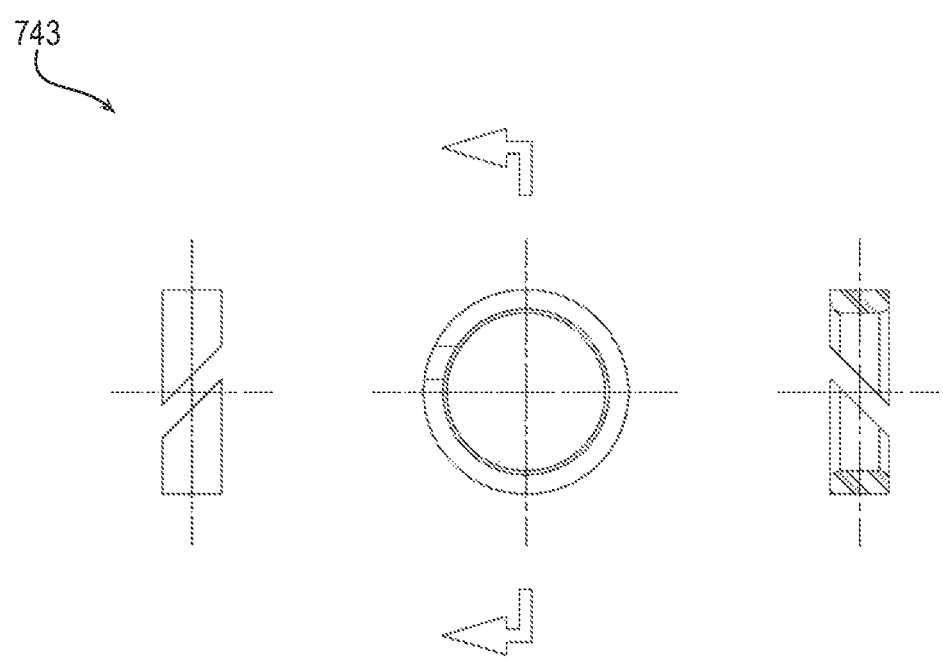
FIG. 10 shows an exemplary friction ring with a wide scarf cut.

FIGS. 8 and 9 show exemplary segmented friction rings 543, 643, and FIG. 10 shows a detail view of an exemplary friction ring 743 with a wide scarf cut design. The friction ring 743 having a wide scarf cut design is particularly resistant to wear because, as the inner diameter of the ring wears from friction with the poppet, the ring may compress, closing the scarf, and maintain good contact with the poppet. The wide scarf cut also insures good contact in high temperature environments where thermal expansion could otherwise cause contact issues.

The annular spacer 150 may be in line with the fluid path and configured to remain rotationally fixed relative to the valve body 110. The spacer 150 may include a poppet chamber 152 in which the poppet is situated. The spacer 150 may also include a venting hole 154 fluidly connecting the poppet chamber 152 to the fluid path 112.

Figure 3:
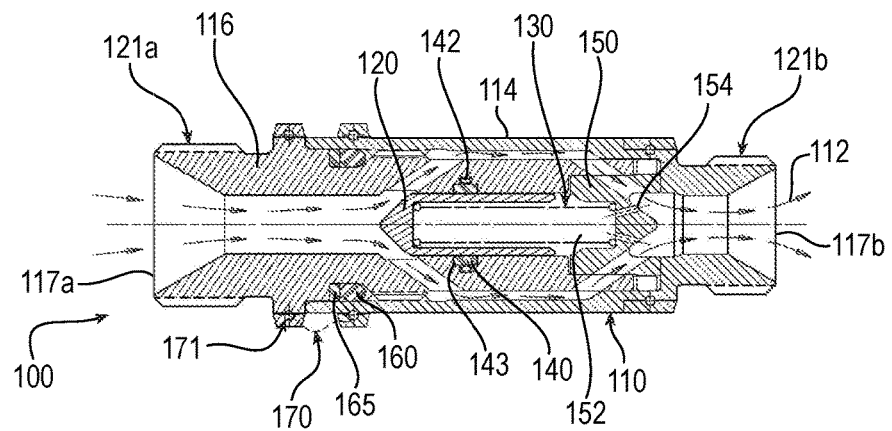
FIG. 3 shows an exemplary non-chattering pressure relief valve at valve open position.

As shown in the FIG. 3, when the inlet pressure exceeds the preset relief pressure, the poppet 120 is pushed from its seated sealing position opening the flow passage for fluid to flow from the inlet 117a to outlet 117b of NCPRV 100. The flow passage is formed or defined by the inner housing 116, poppet 120, outer housing 114 and spacer 150.

AS type fittings integral to the inner housing 116 and outer housing 114 may connect to the system inlet and outlet tubing's respectively. There may be for example, three tangs and slots on the end of inner housing 116 and spacer 150. These tangs and slots engage to prevent rotation of the spacer 150 relative to the inner housing 116, guaranteeing the inlet and outlet windows of the inner housing 116 and spacer 150 are always aligned with each other, maintaining the streamline flow in addition to achieving a low pressure drop.

As shown in FIG. 3, the o-ring 160 and the backup ring 165 are carried by the piston groove of the inner housing 116 to seal the external leak path between the inner housing 116 and the outer housing 114.

Installation of exemplary NCPRV's may include connecting the inlet and outlet fittings to the inlet and outlet of the system tubing. The relief pressure of NCPRV may be preset. At normal condition, the system inlet pressure is below the preset relief pressure of NCPRV. The valve member (poppet) 120 of NCPRV is in the pushed forward location, sitting on the valve seat closing the flow passage. The system fluid is not allowed to bypass the valve seat and maintains the inlet pressure within the pressure range between valving reseat and crack pressures.

As shown in the FIG. 3, during engine operation, when the system inlet pressure reaches the preset relief pressure (i.e., cracking pressure) the pressure force that acts on the valve member (poppet) 120 head will be greater than the preset spring force that is applied on the poppet's inner end, the fluid pushes the poppet 120 to the open or flow position leaving its seated sealing area. Fluid will flow from the inlet fitting 121a through inner housing inlet windows, enter into the annular area between the inner housing 116 and outer housing 114 and flow through the outlet windows of the inner housing 116 and the spacer 150 and then flow out through the outlet 117b of the outer housing 114.

Figure 4:
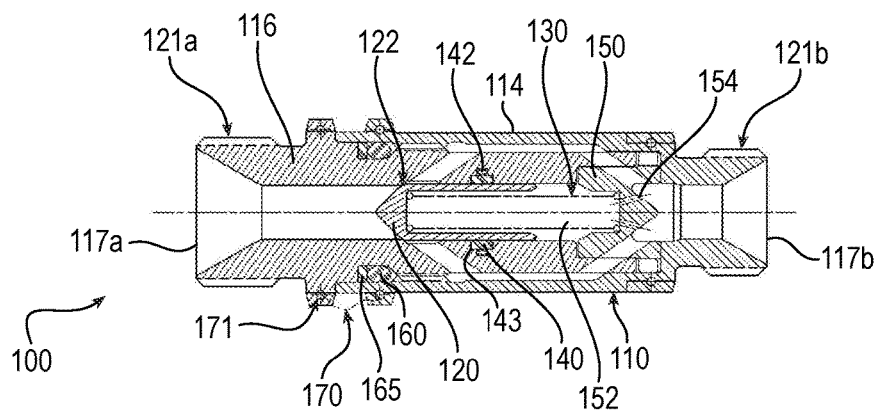
FIG. 4 shows an exemplary non-chattering pressure relief valve at valve closed position.

When the system Inlet pressure is released to lower than the preset reseat pressure, the spring force overcomes the inlet pressure force and the spring 130 pushes the valve member (poppet) 120 back to its seated sealing position and seals the flow passage of the PRV as shown in FIG. 4.

During normal operation of conventional PRVs, there are some conditions existing that trigger the valve member (poppet) to oscillate. These conditions include a) low flow rates and b) fluid flow or mechanical introduced vibration on the system tubing. However, there is a built in oscillating damping mechanism on the NCPRV, i.e., the friction element. The friction element 140 is always in contact with the poppet 120 and generates a certain amount of friction force that is applied on the sliding surface of the poppet 120, thus adding hysteresis to the system. This friction force or hysteresis will dampen the oscillating immediately once the valve chattering occurs, i.e. this friction force will interrupt the harmonic oscillation of the poppet-spring system and dampen the valve chattering.

Another design feature of exemplary NCPRVs which reduces chattering is a flow path which goes around the poppet. Unlike traditional PRV design which has a flow path that goes through the body of the poppet, exemplary NCPRVs divert the flow path around the poppet body. This way, the fluid dynamic pressure that acts on the side of the poppet will be eliminated. This greatly reduces the flow-induced vibration on the poppet in the radial/lateral direction, which is one of the biggest factors that generate chattering in the valve and pressure oscillation between the valve inlet and outlet. Further, the required force to dampen the valve oscillating will also be significantly reduced. This will significantly reduce the PRV hysteresis between the valve opening and closing during the PRV operation.

Figure 5:
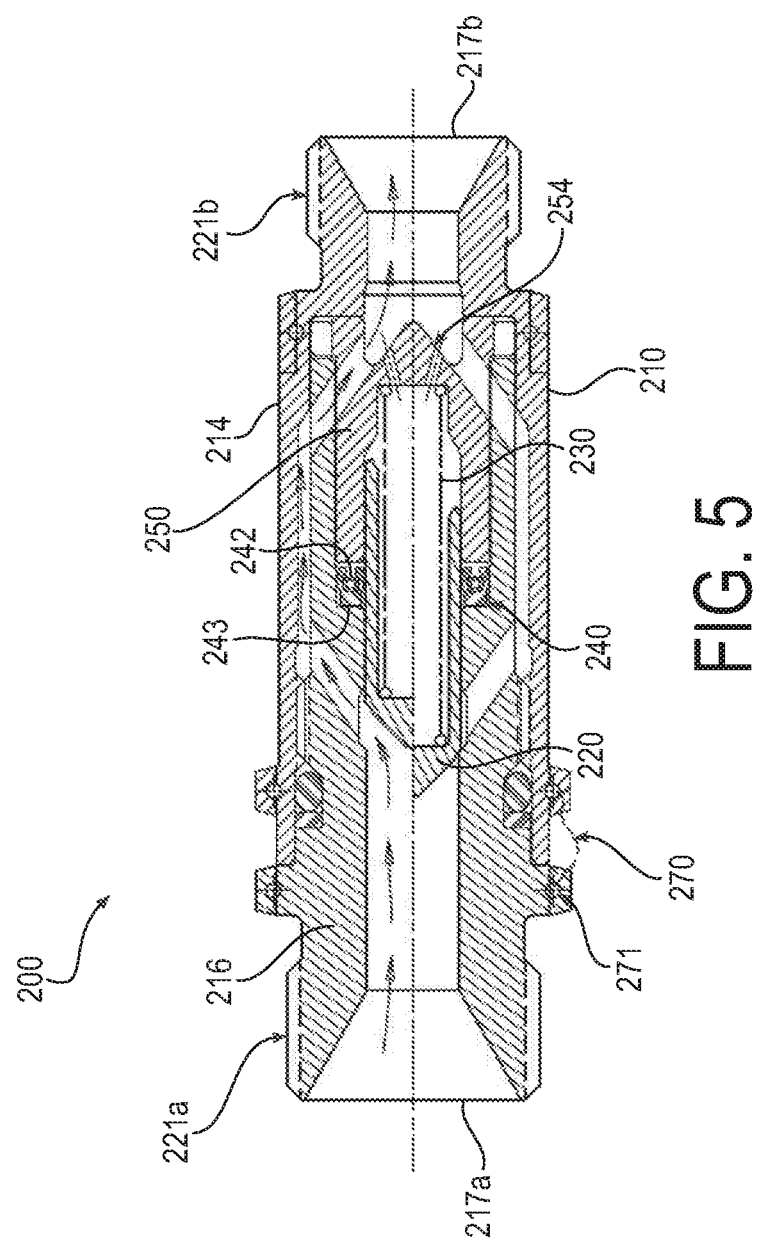
FIG. 5 shows an exemplary pressure relief valve with a flexible spring energized seal as a valve oscillating damping mechanism.
Figure 6:
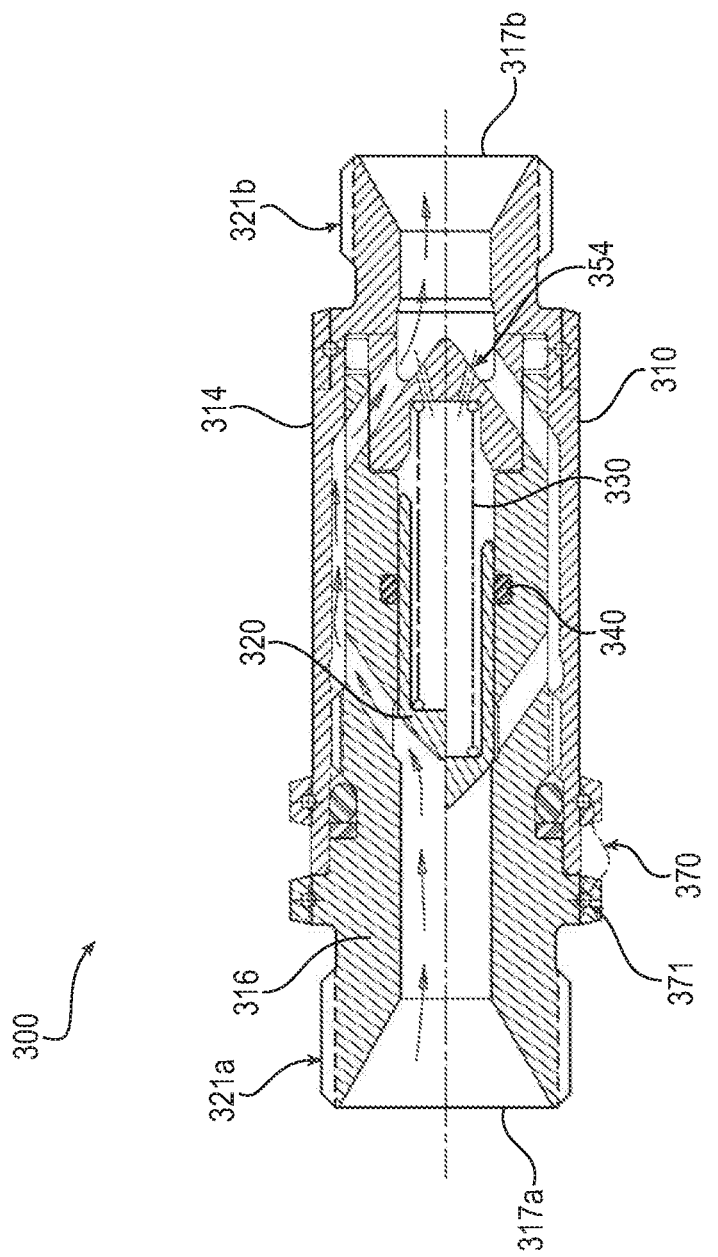
FIG. 6 shows an exemplary pressure relief valve with an o-ring as a valve oscillating damping mechanism.
Figure 7:
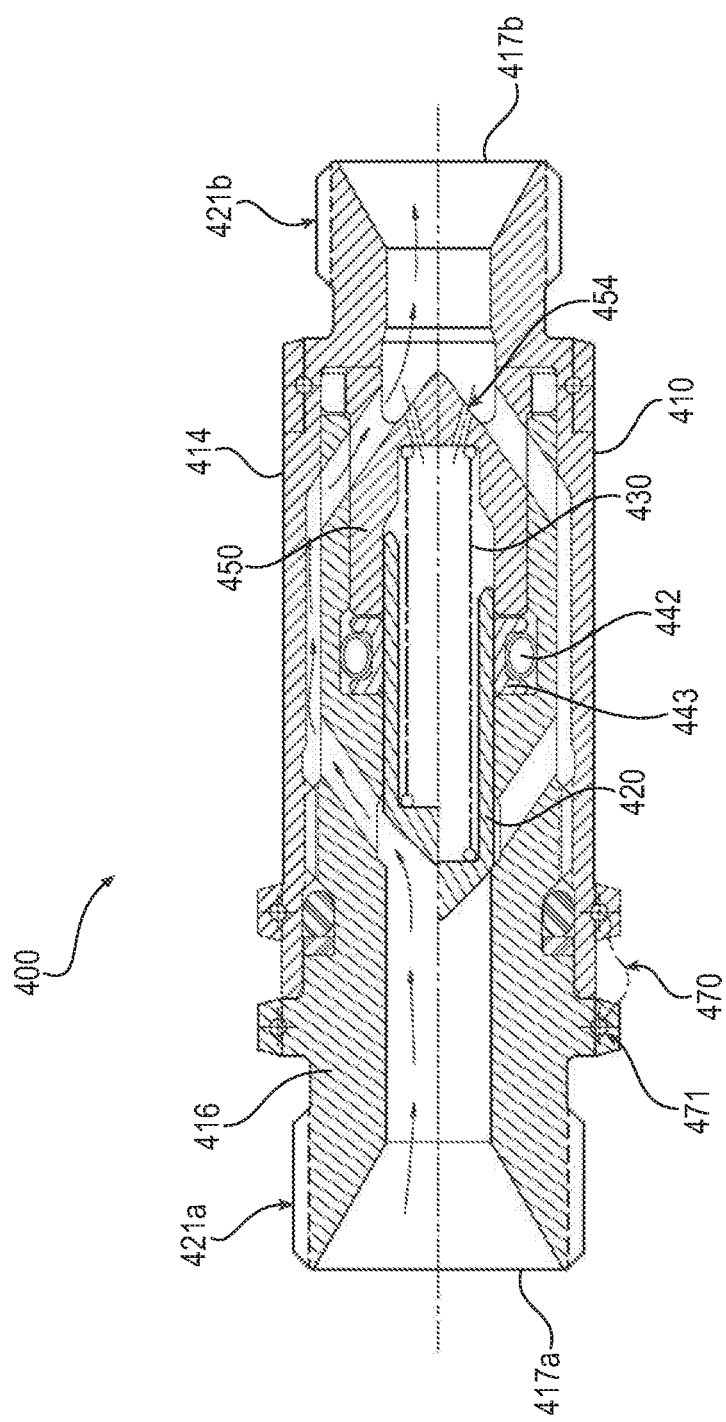
FIG. 7 shows an exemplary pressure relief valve with friction ring segments and a canted spring as a valve oscillating damping mechanism.

Referring to FIGS. 5-7, exemplary embodiments of the NCPRV are shown. The NCPRVs 200, 300, 400 are substantially the same as the above-referenced NCPRV 100, and consequently the same reference numerals but indexed by 100 are used to denote structures corresponding to similar structures in the NCPRV. In addition, the foregoing description of the NCPRV 100 is equally applicable to the NCPRVs 200, 300, 400 except as noted above. Moreover, it will be appreciated upon reading and understanding the specification that aspects of the NCPRVs may be substituted for one another or used in conjunction with one another where applicable.

Additionally, exemplary friction rings are shown in detail in FIGS. 8-10. These friction rings 543, 643, 743 served substantially the same purposes as those used in the exemplary NCPRVs 100, 200, 300, 400 and consequently the same reference numerals but indexed by 100 are used to denote structures corresponding to similar structures in the friction rings. Moreover, it will be appreciated upon reading and understanding the specification that aspects of the friction rings may be substituted for one another or used in conjunction with one another where applicable.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pressure relief valve comprising:
   a valve body having an inlet and an outlet and defining a first fluid path fluidly connecting the inlet and the outlet of the valve, the valve body defining a valve seat;
   a valve member axially moveable between a first position and a second position for sealing against the valve seat, the valve member configured to close the first fluid path in the first position and thereby restrict flow between the inlet and the outlet, the valve member configured to open the fluid path in the second position and thereby allow flow between the inlet and the outlet;
   a biasing element configured to bias the valve member in the first position; and
   a frictional resistance means for preventing the pressure relief valve from oscillating, the frictional resistance means being resiliently biased laterally against an axially extending surface of the valve member to provide frictional resistance to movement of the valve member and thereby cause hysteresis in axial movement of the valve member between the first position and the second position, wherein the frictional resistance means has an inner diameter that is greater than a diameter of the valve seat.

2. The pressure relief valve of claim 1, wherein the valve member is a poppet.

3. The pressure relief valve of claim 2, further comprising an annular spacer in line with the first fluid path and configured to remain fixed relative to the body; and
   a poppet chamber in the spacer.

4. The pressure relief valve of claim 3, wherein a venting hole in the spacer fluidly connects the poppet chamber to the first fluid path.

5. The pressure relief valve of claim 1, wherein the frictional resistance means is an O-ring.

6. The pressure relief valve of claim 1, wherein the axially extending surface of the valve member has a diameter that is no less than a radially outermost diameter of the valve member.

7. A pressure relief valve comprising:
   a housing surrounding a first fluid path that fluidly connects an upstream flow passage and a downstream flow passage of the housing, the upstream flow passage being axially aligned with the downstream flow passage;
   an annular spacer in line with the first fluid path and configured to remain fixed relative to the housing;
   a poppet chamber in the spacer;
   a poppet configured to slide axially within the poppet chamber and having a head to seal against a valve seat in the housing, wherein in a first closed position, the poppet prevents fluid flow through the first fluid path, and in a second, open position, the poppet allows fluid flow through the first fluid path;
   a friction element configured to press laterally against an axially extending surface of the poppet and cause hysteresis in axial movement of the poppet between the first position and the second position, wherein the friction element has an inner diameter that is greater than a diameter of the valve seat; and
   a biasing element configured to bias the poppet outwardly from the chamber of the spacer into the first closed position,
   wherein a portion of the first fluid path is between the housing and the spacer.

8. The pressure relief valve of claim 7, wherein a venting hole in the spacer fluidly connects the poppet chamber to the first fluid path.

9. The pressure relief valve of claim 7, wherein the friction element is an O-ring.

* * * * *